United States Patent Office 3,458,514
Patented July 29, 1969

3,458,514
1-MONOCARBOCYCLIC ARYL-3-PIPERAZINO PROPINES
Giuseppe Palazzo, Rome, Italy, assignor to Aziende Chimiche Riunite Angelini Francesco A.C.R.A.F. S.p.A., Rome, Italy
No Drawing. Filed Oct. 25, 1965, Ser. No. 505,429
Claims priority, application Italy, Aug. 23, 1965, 8,304/65
Int. Cl. C07d 51/70; A61k 27/00
U.S. Cl. 260—268
6 Claims

ABSTRACT OF THE DISCLOSURE 1-monocarbocyclic aryl-3-piperazino propines prepared by reacting a monocarboxycyclic aryl acetylene with formaldehyde and a piperazine. The compounds have anti-ulcer activity.

---

The present invention concerns a series of novel N,N-disubstituted 1-aryl-3-aminopropines endowed with anti-ulcer activity, belonging to the general formula

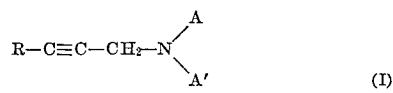
(I)

wherein R is a member selected from the class consisting of phenyl, methylphenyl, halophenyl, nitrophenyl, aminophenyl, and lower ($C_1$–$C_4$) alkoxyphenyl;

is a member selected from the class consisting of N'-methylpiperazino, N'-benzylpiperazino, N'-phenylpiperazino, N'-chlorophenylpiperazino, N'-methoxyphenylpiperazino, N'-$\beta$-hydroxyethylpiperazino, N'-$\beta$-acetoxyethylpiperazino, N'-$\beta'$-propionoxyethylpiperazino, and N'-carbethoxyethylpiperazino, or the physiologically active salts thereof.

Such products are already known in the literature, which are obtained by means of the Mannich reaction on the phenylacetylene, for instance 1-phenyl-N,N-dimethyl-aminopropine and the corresponding diethylamine and piperidine terms. Furthermore, compounds are known, obtained by the same way, carrying p-methoxyphenylic, o-nitrophenylic, p-nitrophenylic and/or aminophenylic radicals. (C. Mannich and Fu Tsong Chang, Ber. 66, 418, 1933.)

In addition a compound is known having the formula

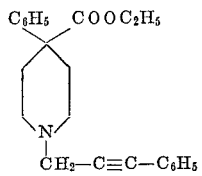

synthesized by B. Elpern, L. N. Gardner and L. Grumbach, J. Am. Chem. Soc. 79, 1951 (1957), whose analgesic activity has been investigated however with negative result. The compounds prepared by Mannich and Fu Tsong proved to be likewise inactive from said point of view.

The applicant has now found that by the above-cited Mannich reaction a series of N,N-disubstituted 1-aryl-3-aminopropines may be obtained which have exhibited an interesting pharmacological activity, more precisely a very pronounced anti-ulceration. Moreover, the products obtained according to this invention display remarkable pharmacodynamic properties of another kind, as the sedative action, the myorelaxing action of papaverinic kind on the smooth musculature and the analgesic-anti-inflammatory action.

According to the method of this invention, the substances of the general Formula I are prepared from the corresponding arylacetylenes by reaction with formaldehyde and secondary amines. According to a preferred embodiment the reaction is carried out at boiling in dioxane, with stoichiometrically equivalent amounts of arylacetylene, of trioxymethylene and of amine. It is operated profitably in the presence of catalytic amounts of copper acetate which improve remarkably the yield. The products are separated by taking advantage of their basic function and purified by distillation under reduced pressure. They are then converted to salts, generally hydrochlorides, however also maleates, citrates, phosphates, tartrates, benzylates, for the pharmacological investigation. The so obtained products show, as stated above, an interesting pharmacodynamic activity, as appears from the following description.

MATERIALS AND METHODS

The acute toxicity was determined on the mouse by utilizing the method of Lichtfield and Wilcoxon (J. Pharmacol. Exp. Ther. 96, 99, 1949). The products were administered intraperitoneally, recording then the mortality appearing within five days subsequent to the treatment. The effects on behaviour were investigated on the mouse, the rat and on the cat while utilizing the scheme proposed by Irwin (Report of the "Gordon Research Conference on Medicinal Chemistry," Aug. 3–7, 1959, Colby Jr. College, New London). A further analysis of the ascertained effects was carried out through the study of the spontaneous motility of the mouse and of the conditioned reflexes of the rat (Cook and Weidley, Ann. N.Y. Acad. M. Sc., 66, 740, 1957).

In order to investigate the effects on the isolated intestine, segments of the small intestine of the guinea pig were utilized, stimulated with acetylcholine, hystamine, DNPP or dimethylphenylpiperazino and barium chloride. The concentration was determined whereby the intestinal contractions were inhibited by 50%.

The effects on the pressure and breathing were investigated by employing cats narcotized with chloralose. Pressure and breathing were recorded by introducing cannulae in the femoral artery and in the trachea.

Moreover, the conventional pharmacological tests have been performed which are carried out in the screening investigations. However, only the ones which led to conclusive results will be mentioned.

The anti-ulcer action was studied by utilizing the immobilization ulcer (Rossi et al., C.R. Soc. Biol., 150, 2124, 1956), the reserpine ulcer and the fasting ulcer (Robert and Nezamis, Proc. Soc. Exp. Biol., N.Y., 98, 9, 1958). In some cases we have moreover studied the ulcer produced in the rat by means of cortisone and fasting on alternated days (Koller, Arzneimittel-Forsch., 10, 1033, 1960).

The analgesic action was investigated by the method of the hot plate (Wolfe and MacDonald, J. Pharmacol. Exp. Ther. 80, 300, 1944), and of the phenylquinone (Siegmund et al., Proc. Soc. Exp. Biol. Med., 95, 729, 1957).

On the contrary, the anti-inflammatory action was investigated by utilizing the podalic oedema induced in the rat by local injection of carragenine (Winter et al., Proc. Soc. Exp. Biol. (N.Y.), 111, 544, 1962).

RESULTS

The acute toxicity of the tested products has proved to be moderate and anyhow such as to not be a hindrance to an occasional clinical experimentation. The values thereof vary from a maximum of 150 mg./kg. I.W. up to values higher than 1000 mg./kg. I.W. Behaviour investigation proved moreover that many derivatives are endowed with a rather good sedative action already at doses of 25–50 mg./kg. In all of these derivatives the curves dose-effect are very flattened while showing the presence of a sedative action more similar to the one of the tranquillizers than to the one of the barbiturics, wherewith on the contrary a symptomatology of sedation changes rapidly to a hypnose one. Under very high doses or at tonic doses almost all of the products cause convulsions.

As regards the effects on the isolated intestine, in many products an antispasmodic action of the aspecific type was evidenced. In fact, the active concentrations with respect to the acetylcholine, the histamine and the DNPP are more or less equivalent, so that they allow all of said products to be approached more to the papaverine than to specific inhibitors as the anti-histaminics and the anti-cholinergics.

As regards the active doses, they may be varied from 1 gamma to reach concentrations of up to 8 gammas per ml., whereas some products on the contrary are wholly inactive. At doses of 5–10 mg./kg., a temporary hypotension occurs while the breathing remains unaltered. A number of products of the series display significant anti-ulcer properties under the various experimental conditions applied in order to investigate this effect. The active doses vary from 10–20 mg./kg. "sub cute" up to 20–40 mg./kg. "per os." From a quantitative viewpoint, it is to be pointed out that typical anti-cholinergic substances such as bantines and probantine are active at doses comprised between 5 and 10 mg./kg. "sub cute." In said cases however a specific anti-cholinergic effect is involved which certainly does not intervene in the case of the considered products. Finally, it may be noticed that some of the mentioned derivatives display also analgesic anti-inflammatory properties. Analgesic properties are generally specific in respect of the inflammatory pain studied by means of the phenylquinone test, whereas no product inhibits significantly the response of non-inflammatory pain studied by means of the hot plate test. The active doses vary from 20 to 40 mg./kg. "sub cute." Said products are therefore about twice more active than the aspirin which is active at doses comprised between 60 and 100 mg./kg. S.C. Anti-inflammatory action is chiefly marked in the products which inhibit the inflammatory pain. The active doses in this case are from 7.5 to 15 mg./kg. S.C. The products are slightly less active than the phenylbutazone, however much more active than substances such as the acetylsalicylic acid.

CONCLUSIONS

The considered derivatives are made promising from a therapeutical point of view owing to their poor toxicity and to the presence of interesting pharmacodynamic properties such as the sedative action, the anti-ulcer action, the myorelaxing action on the smooth musculature of the papaverinic type and the analgesic-anti-inflammatory activity.

Chiefly the fact is to be emphasized that a number of said derivatives exhibit anti-ulcer properties in the absence of anti-cholinergic properties. Accordingly, the mechanism of this protective effect has to be considered of quite particular kind.

The process of this invention is illustrated by the following examples:

EXAMPLE 1

1-phenyl-3-N'-phenylpiperazino-propine

A mixture of 10.2 g. phenylacetylene, 16.2 g. N-phenylpiperazine, 3 g. trioxymethylene and 0.4 g. copper acetate is heated under refluxing for twenty-four hours under stirring. The mixture is cooled, filtered off from little insoluble substance and the solvent is evaporated to dryness under reduced pressure. The residue is treated with a little water and is repeatedly extracted with ether. The combined ethereal layers are treated with 2 N hydrochloric acid. By this treatment the scarcely soluble hydrochloride of the product separates under form of an oil which soon solidifies. It is filtered and suspended in water, then the mixture is alkalinized with diluted NaOH. Thus the 1-phenyl-3-N'-phenylpiperazino-propine separates as a dense oil which is extracted with ether. The ethereal solution is thoroughly washed with water and then dried on sodium sulfate. The solvent is removed and the residue (22 g.) is distilled under reduced pressure. The pure product boils at 175° C. under 0.3 mm.

*Analysis.*—Calculated for $C_{19}H_{20}N_2$: C, 82.57; H, 7.29; N, 10.14. Found: C, 82.39; H, 7.23; N, 10.13.

The di-hydrochloride crystallizes from absolute alcohol and shows M.P. 203° C.

According to the same technique while starting with the suitable arylacetylenes and the corresponding secondary amines, the hereinafter listed products were obtained, showing the single indicated characteristics:

(2) 1-phenyl - 3 - N - (N'-methyl)piperazino-propine, $B.P._{0.2}$ 135° C., 2 HCl, M.P. 199° C.

(3) 1-phenyl - 3 - N - (N'-β-hydroxyethyl)piperazino-propine, $B.P._{0.2}$ 177° C., 2 HCl, M.P. 203° C.

(4) 1-m. chlorophenyl - 3 - N-(N'-methyl)piperazino-propine, $B.P._{0.1}$ 134° C., 2 HCl, M.P. 230° C.

(5) 1-m. chlorophenyl - 3 - N-(N'-phenyl)piperazino-propine, 2 HCl, M.P. 218° C.

(6) 1-p. chlorophenyl - 3 - N-(N'-methyl)piperazino-propine, $B.P._{0.1}$ 143° C., 2 HCl, M.P. 255° C.

(7) 1-p. chlorophenyl - 3 - N-(N'-phenyl)piperazino-propine, M.P. 111° C., 2 HCl, M.P. 221° C.

(8) 1 - phenyl-3-N-(N'-benzyl)-piperazino-propine, 2 HCl, M.P. 250° C.

(9) 1-m. chlorophenyl-3-N-(N'-β-hydroxyethyl)piperazino-propine, $B.P._{0.1}$ 172° C., 2 HCl, M.P. 230° C.

(10) 1 - p. chlorophenyl-3-N-(N'-β-hydroxyethyl)piperazino-propine, M.P. 81° C., 2 HCl, M.P. 262° C.

(11) 1-phenyl-3-N-(N'-carbethoxy)piperazino-propine, $B.P._{0.2}$ 170° C., HCl, M.P. 185° C.

(12) 1-phenyl - 3 - N-(N'-o. chlorophenyl)piperazino-propine, HCl, M.P. 188° C.

(13) 1-phenyl-3-N-(N'm. chlorophenyl)piperazino-propine, M.P. 63° C., HCl, M.P. 199° C.

(14) 1 - phenyl-3-N-(N'-p. chlorophenyl)piperazino-propine, M.P. 93° C., 2 HCl, M.P. 198° C.

(15) 1-phenyl-3-N-(N'-o. tolyl)-piperazino - propine, HCl, M.P. 198° C.

(16) 1-o. tolyl-3-N-(N'-methyl)-piperazino - propine, $B.P._{0.1}$ 125° C., 2 HCl, M.P. 237° C.

What I claim is:

1. A compound having the formula

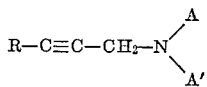

wherein R is a member selected from the class consisting of phenyl, methylphenyl, halophenyl, nitrophenyl, aminophenyl, and lower ($C_1$–$C_4$) alkoxyphenyl;

is a member selected from the class consisting of N'-methylpiperazino, N'-benzylpiperazino, N'-phenylpiperazino, N'-chlorophenylpiperazino, N'-methoxyphenylpiperazino, N'-β-hydroxyethylpiperazino, N' - β - acetoxyethylpiperazino, N'-β-propionoxyethylpiperazino, and N'-carbethoxyethylpiperazino, or the physiologically active salts thereof.

2. As a compound according to claim 1, 1-phenyl-3-N'-phenylpiperazino-propine.

3. As a compound according to claim 1, 1-m. chlorophenyl-3-N'-methylpiperazino-propine.

4. As a compound according to claim 1, 1-m. chlorophenyl-3-N'-phenylpiperazino-propine.

5. As a compound according to claim 1, 1-m. chlorophenyl-3-N'-β-hydroxyethylpiperazino-propine.

6. As a compound according to claim 1, 1-phenyl-3-N'-p. chlorophenylpiperazino-propine.

References Cited

Vereshchagin et al.: Chemical Abstracts vol. 62, p. 9089G (1965).

Mannich et al.: Ber. 66, 418 (1933).

ALEX MAZEL, Primary Examiner

J. TOVAR, Assistant Examiner

U.S. Cl. X.R.

424—250